Patented Mar. 22, 1949

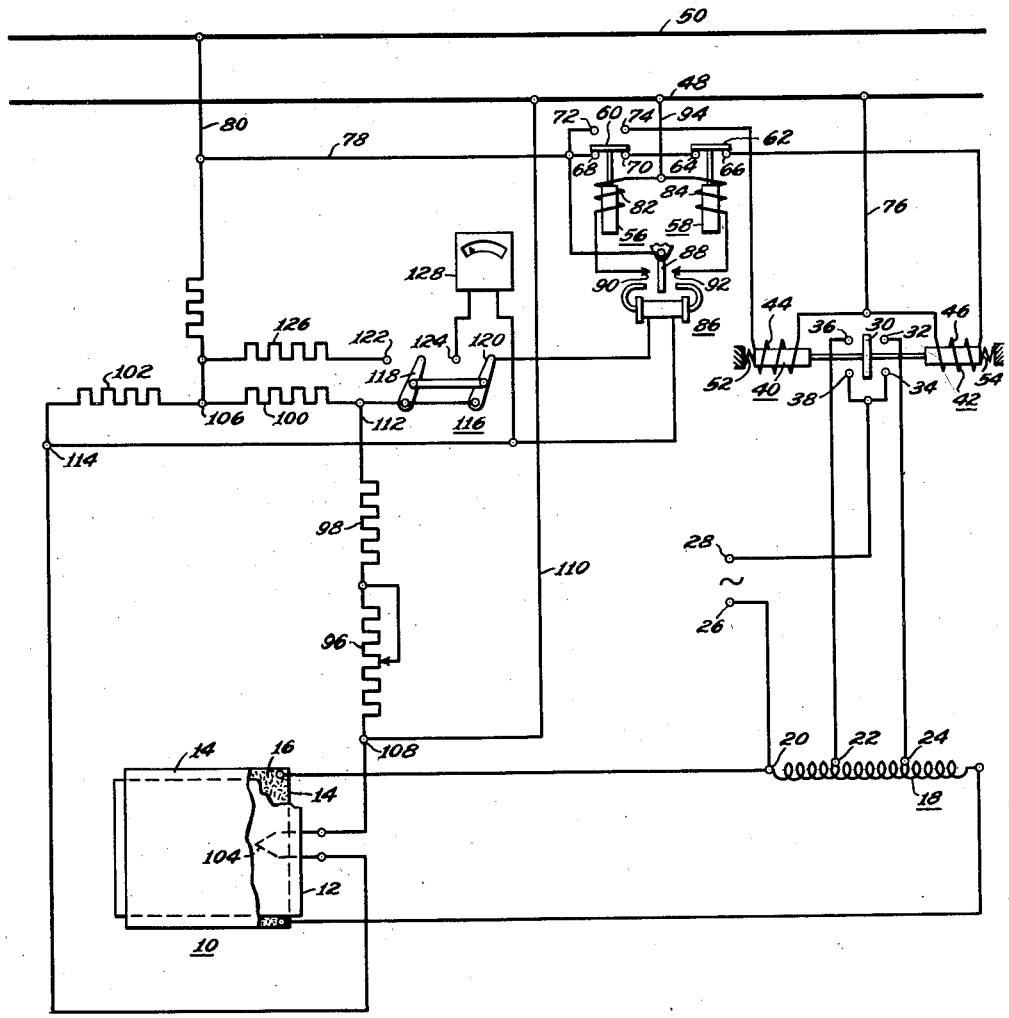

2,465,312

UNITED STATES PATENT OFFICE 2,465,312

TEMPERATURE REGULATING SYSTEM

Clarence L. Mershon, Lima, Ohio, assignor to Westinghouse Electric Corporation, East Pittsburgh, Pa., a corporation of Pennsylvania Application December 30, 1947, Serial No. 794,525

5 Claims. (Cl. 219—20)

This invention relates to temperature indicating systems and, in particular, to systems for regulating the temperature of windows.

Recently systems have been developed for controlling the temperature of windows, such as in aircraft, to prevent the frosting of the windows. Such systems are shown in my copending applications, Serial No. 750,904, filed May 28, 1947, now Patent No. 2,462,207, issued February 22, 1949, and applications Serial No. 794,526, and Serial No. 794,527, both of which were filed simultaneously with this application.

In practice, while it is found that the industry is satisfied with the regulating systems referred to for controlling the temperature of the windows, the industry also requires a system for visually indicating the temperature of the windows. Indicating systems which operate independently of the regulating or control systems are known, but such systems require considerable additional equipment such as bridging circuits including temperature sensing elements and other components. This greatly adds to the weight of the equipment as well as to the expense.

An object of this invention is to provide a system for regulating the temperature of a window in which provision is made for obtaining a visual indication of the temperature of the window.

Another object of this invention is to provide, in a system for regulating the temperature of a window and which utilizes a resistance bridge circuit for controlling the regulating operation, for recalibrating the bridge circuit and connecting an indicator to the recalibrating bridge circuit to obtain a visual indication of the temperature of the window while at the same time effecting an operation of the regulator to insure a predetermined supply of heating current to the window.

Other objects of this invention will become apparent from the following description when taken in conjunction with the accompanying drawing, the single figure of which is a diagrammatic view of apparatus and circuits involving the teachings of this invention.

Referring to the drawing, this invention is illustrated by reference to a system for controlling the temperature of a window pane 10. The window pane 10 in this instance, is formed of a layer 12 of plastic sandwiched between two layers of glass 14, one layer of glass having a coating 16 thereon formed of a conductive material which will function as a resistor element therebetween. Such a window pane 10 is more fully described in Technical Glass Bulletin No. 15 of the Pittsburgh Plate Glass Company of Pittsburgh, Pennsylvania. The composition of layers 12, 14 and 16 may be of many different materials so long as the combination acts as a transparent window pane, and the conductive layer 16 functions as a resistor element in the combination.

In order to supply current to the layer 16 of conductive material to effectively heat the window pane 10, the layer 16 is connected across the secondary windings of an auto transformer 18, the primary windings of which are provided with taps 20, 22 and 24 disposed to be selectively connected through terminals 26 and 28 to a suitable source of power supply such as an inverter (not shown).

In order to control the connections of the primary windings of transformer 18 to the source represented by the terminals 26 and 28 to control the current supplied to the layer 16, a switching contact member 30 is disposed to be selectively actuated to any one of three positions such as the neutral open circuit position illustrated, or to the right thereof to bridge fixed contact members 32 and 34, or to the left thereof to bridge fixed contact members 36 and 38. The switching contact member 30 is disposed to connect the taps 20 and 24 of the primary windings of the transformer 18 to the source of supply when actuated to the right to bridge the contact members 32 and 34 or to connect the taps 20 and 22 of the primary windings of the transformer 18 to the source of supply when actuated to the left to bridge the fixed contact members 36 and 38.

The switching contact member 30 is common to two electromagnets 40 and 42, being disposed to be selectively actuated as the windings 44 and 46 are selectively energized from a source of power supply represented by conductors 48 and 50. As illustrated, the electromagnets 40 and 42 are disposed so that when energized, movement of the solenoids thereof is opposed by spring members 52 and 54, respectively. When the windings 44 and 46 are deenergized, the switching contact member 30 is maintained in the illustrated neutral position by the opposed biasing forces of springs 52 and 54.

In order to selectively control the energization of the windings 44 and 46 of the electromagnets 40 and 42, respectively, a pair of contactors 56 and 58 having contact members 60 and 62, respectively, are disposed for operation to control the connection of the windings 44 and 46 to the supply conductor 50. As illustrated, the contact member 62 of the contactor 58 is disposed to bridge fixed contact members 64 and 66, respectively, when deenergized whereas the contact member 60 of the contactor 56 is disposed to bridge fixed contact members 68 and 70 when in the deenergized position and fixed contact members 72 and 74 when in the energized position. Thus with the contactors 56 and 58 deenergized, the contact members 60 and 62 function to establish a circuit extending from conductor 48 through conductor 76, energizing winding 46 of the electromagnet 42, contact members 60, 62 and 64 of the contactor 58, contact members 70, 60 and 68 of the contactor 56, and conductors 78 and 80 to the supply conductor 50 to energize the winding 46.

On the other hand, if the contactor 56 is energized to interrupt the circuit just described, the contact member 68 bridges the fixed contact members 72 and 74 to establish a circuit extending from supply conductor 48 through conductor 76, energizing winding 44 of the electromagnet 40, contact members 74, 68 and 72 of the contactor 56, and conductors 78 and 80 to the supply conductor 50 to effect energization of the electromagnet 40 to actuate the switching contact member 30 to the left to bridge the fixed contact members 36 and 38.

In order to selectively control the energization of the energizing windings 82 and 84 of the contactors 56 and 58, respectively, a polarized relay 86 is disposed to be energized depending upon the temperature of the window pane 10. Thus the polarized relay 86 is provided with a movable armature contact member 88 disposed to be selectively actuated to engage fixed contact members 90 and 92 depending upon the direction of energization of the polarized relay 86. As illustrated, the armature contact member 88 is disposed when actuated to the left to establish a circuit extending from the supply conductor 48 through conductor 94, energizing winding 82 of the contactor 56, contact members 90 and 88 of the polarized relay 86, and conductors 78 and 80 to the supply conductor 50 to effect energization of the contactor 56. Likewise, if the armature contact arm or member 88 of the polarized relay 86 is actuated to the right to engage contact member 92, a circuit is established extending from conductor 48 through conductor 94, the energizing winding 84 of contact 58, contact members 92 and 88 of the polarized relay 86, and conductors 78 and 80 to the supply conductor 50 to effect energization of the winding 84 to actuate contact member 62 of the contactor 58 to an open circuit position.

The polarized relay 86 is disposed to be normally connected across a resistance bridge formed of resistors 96, 98, 100, 102 and 104. As illustrated, the resistors 96, 98 and 100 comprise one leg of the resistor bridge, resistors 102 and 104 forming the other leg, the two legs being connected at their intermediate points 106 and 108 by conductors 80 and 110, respectively, to supply conductors 50 and 48, respectively. As illustrated, the energizing winding of the polarized relay 86 is disposed to be normally connected to intermediate taps 112 and 114 in the legs of the resistance bridge, a switch 116 being disposed for movement to disconnect the polarized relay 86 from the resistance bridge just described.

In this embodiment the resistor 104 is formed of any material having a high temperature coefficient of resistance such as nickel wire, resistor 104 being represented as being disposed closely adjacent to the window pane 10 and where possible, imbedded in the plastic layer 12 of the window so that the resistance of the resistor 104 will vary directly as the temperature of the window pane varies from a predetermined temperature which is to be maintained. On the other hand, the resistors 96, 98, 100 and 102 are preferably formed of a material having a low temperature coefficient of resistance, such as Advance, the resistor 102 also preferably being positioned so that the leads to the resistors 102 and 104 will be approximately equal to eliminate errors in the resistance within the bridge itself. The resistance bridge can be initially balanced by adjusting the resistor 96.

The switch 116 is formed of two contact arms 118 and 120 disposed for movement from the position illustrated for connecting the polarized relay 86 across the bridge circuit to a position where the contact arms 118 and 120 engage fixed contact members 122 and 124, respectively, for simultaneously connecting a resistor 126 in parallel circuit relation with the resistor 100 of the resistance bridge circuit and to connect an indicator 128 across the resistance bridge circuit to the intermediate taps 112 and 114.

The resistor 126 is connected in parallel circuit relation with the resistor 100 in order to recalibrate the bridge circuit to lower the balance point thereof depending upon the type of indicator 128 which is utilized for giving a visual indication of the temperature of the window pane 10. Normally, the bridge circuit is so balanced that when the ambient temperature of the sensing element 104 is 120° F., the bridge circuit is in balance so that the polarized armature contact arm 84 of the polarized relay 86 will be maintained in the neutral position shown. It is necessary to recalibrate the bridge circuit so that the recalibrated zero voltage balance point will be at a point which will correspond to the lowest temperature reading and zero current point on the indicator 128. In practice, it is desired to so change the balance point by connecting the resistor 126 in parallel circuit relation with the resistor 100 that the bridge circuit will be in balance when the temperature of the sensing element 104 is 75° F. With such a recalibration, it is possible to obtain an instantaneous reading on the indicator 128 which will register the temperature of the window pane at any temperature from 75° F. to a temperature higher than the normal temperature of 120° F.

In operation, assuming that the bridge circuit has been properly balanced to maintain a predetermined temperature of the window pane 10 and that the switch 116 is in the position shown, the polarized relay 86 is then deenergized with its armature contact member 88 in the deenergized position illustrated. Under such conditions the energizing winding 46 of the electromagnet 42 is energized to actuate the contact member 30 associated with electromagnets 40 and 42 toward the right to bridge the contact members 32 and 34 and connect the primary windings between the taps 20 and 24 of the transformer 18 to the source of power supply represented by the terminals 26 and 28 to supply sufficient current to the conductive layer 16 to maintain the bridge circuit in the balanced condition referred to.

If during flying conditions the temperature of the window pane 10 should decrease from the predetermined temperature which it is desired to maintain thereby requiring more heat to keep the window pane from frosting or icing over, then the resistance of the resistor 104 decreases in accordance with the temperature decrease with the result that the bridge circuit is unbalanced. Under such conditions, the polarity of the midterminal 114 of the resistance bridge circuit becomes more positive with respect to the polarity of the mid-terminal 112, and current flows from the mid-terminal 114 through the winding of the polarized relay 86 and contact arm 120 of the switch 116 to the mid-terminal 112.

When the winding of the polarized relay 86 is thus energized, the armature contact member 88 thereof is moved to the left to engage the contact 90 thereof to establish the energizing circuit for the winding 82 of the contactor 56. When the contactor 56 is thus energized, the contact member 60 thereof is actuated to interrupt the energizing circuit to the energizing winding 46 of the electromagnet 42 and is actuated to bridge the fixed contact members 72 and 74 to establish the energizing circuit for the energizing winding 44 of the electromagnet 40. When the energizing winding 46 of the electromagnet 42 is thus deenergized, and the energizing winding 44 of electromagnet 40 is energized, the contact member 30 is actuated to the left to disengage the fixed contact members 32 and 34 and thereby disconnect the tap 24 from the source of supply and to engage the fixed contact members 36 and 38 to connect the tap 22 of the primary windings of the transformer 18 to the source of supply to thereby increase the flow of current to the conductive layer 16 of the window pane to effect an increase in the temperature of the window pane 10.

If, on the other hand, the temperature of the window pane 10 should increase as, for example, where the airplane is stationary on the ground, then the resistance of resistor 104 increases in accordance with the increase in temperature whereby the polarity of the mid-terminal 112 becomes more positive with respect to the polarity of the mid-terminal 114, and current flows through the winding of the polarized relay 86 in a direction to actuate the armature contact member 88 to the right to engage a fixed contact member 92 to establish the energizing circuit for the winding 84 of contactor 58. Under such conditions, the contact member 62 of contact 58 is actuated to an open circuit position, and since contactor 56 is deenergized, the windings 46 and 44, respectively, of electromagnets 42 and 40, respectively, will be deenergized whereby the switch contact member 30 will be maintained in the neutral position shown to disconnect the primary windings of the transformer 18 from the source of power supply and thereby prevent current from flowing through the conductive layer 16 of the window pane 10.

If during the operations described hereinabove it is desired to obtain a visual indication of the temperature of the window pane 10, then the switch 116 is actuated to the left from the position shown to disconnect the polarized relay 86 from the resistance bridge circuit and to effect the recalibration of the bridge circuit by connecting the resistor 126 in parallel circuit relation with the resistor 100. At the same time, the indicator 128 is connected across the mid-terminals 112 and 114 of the bridge circuit so that a visual indication of the temperature of the window pane as measured by the unbalance from the recalibrated balance point of the resistance bridge circuit is given by the indicator 128.

It is to be appreciated that the operation of the switch 116 for obtaining a visual indication of the temperature window pane 10 is of short duration, the switch 116 being actuated to the right immediately after the indication of the temperaure is noted to again connect the polarized relay 86 across the bridge circuit. However, when the indicator 128 is connected across the bridge circuit, it is to be noted that the polarized relay 86 is deenergized and that its armature contact member 88 is in the neutral position shown with the result that the contactors 56 and 58 are deenergized. Under such circumstances, the contact members 60 and 62 effectively connect the energizing winding 46 of the electromagnet 42 to be energized to thereby effect the actuation of the contact member 30 to the right to bridge the fixed contact members 32 and 34 to insure the connection of the primary windings between the taps 20 and 24 of the transformer 18 to the source of supply whereby a predetermined current flows to the conducting layer 16 of the window pane to prevent loss of temperature from the window while the visual indication is being obtained.

The system described is very sensitive, giving good regulation of the temperature of the window pane while affording a visual indication of the temperature of the window pane without complicating the system with additional bridge circuits and other components. Thus by the use of one additional resistor, a switch and the indicating meter, the disadvantage of prior systems are overcome with the advantage that the indication can be obtained with a very little increase in weight of the apparatus employed for regulating the temperature of the window.

I claim as my invention:

1. In a system for regulating the temperature of a window having a resistor heating element associated therewith, in combination, means disposed for operation to control the flow of current to the resistor heating element, means disposed to be directionally energized for controlling the operation of the operating means, a resistance bridge circuit having a resistor leg thereof disposed in juxtaposition to the window whereby the resistance of said leg varies in accordance with the temperature of the window, an auxiliary resistor disposed to be connected in circuit relation with another leg of the resistance bridge circuit to recalibrate the balance point of the bridge circuit, an indicator disposed to be connected across the resistance bridge circuit to give an indication of the temperature of the window, and switching means disposed to connect the directionally energized means across the resistance bridge circuit for controlling the operation of the operating means in accordance with the unbalance of the resistance bridge circuit, the switching means being disposed for operation to connect the auxiliary resistor in circuit relation with said another leg of the resistance bridge circuit and connect the temperature indicator thereacross and simultaneously therewith disconnect the directionally energized means therefrom to effect a predetermined operation of the operating means to control the flow of current to the resistor heating element in a predetermined manner.

2. In a system for regulating the temperature of a window having a resistor heating element associated therewith, in combination, a transformer disposed to be connected in circuit between the resistor heating element and a source of power supply, means disposed to be selectively energized for controlling the connections of the transformer in said circuit to thereby control the flow of current to the resistor heating element, means disposed to be directionally energized for controlling the energization of the selectively energized means, a resistance bridge circuit having a resistor leg thereof disposed in juxtaposition to the window whereby the resistance of said leg varies in accordance with the temperature of the window, an auxiliary resistor disposed to be connected in circuit relation with another leg of the resistance bridge circuit to recalibrate the balance point of the bridge circuit, an indicator disposed to be connected across the resistance bridge circuit to give an indication of the temperature of the window, and switching means disposed to connect the directionally energized means across the resistance bridge circuit for controlling the energization of the selectively energized means in accordance with the unbalance of the resistance bridge circuit, the switching means being disposed for operation to connect the auxiliary resistor in circuit relation with said another leg of the resistance bridge circuit and connect the temperature indicator thereacross and simultaneously therewith disconnect the directionally energized means therefrom to effect a predetermined operation of the selectively energized means to connect the transformer to the source of power supply in a predetermined manner.

3. In a system for regulating the temperature of a window having a resistor heating element associated therewith, in combination, a transformer disposed to be connected in circuit between the resistor heating element and a source of power supply, means disposed to be selectively energized to control the connections of the transformer in said circuit, means disposed for operation to effect the selective energization of said control means, means disposed to be directionally energized for controlling the operation of the operating means, a resistance bridge circuit having a resistor leg thereof disposed in juxtaposition to the window whereby the resistance of said leg varies in accordance with the temperature of the window, an auxiliary resistor disposed to be connected in circuit relation with another leg of the resistance bridge circuit to recalibrate the balance point of the bridge circuit, an indicator disposed to be connected across the resistance bridge circuit to give an indication of the temperature of the window, and switching means disposed to connect the directionally energized means across the resistance bridge circuit for controlling the operation of the operating means, in accordance with the unbalance of the resistance bridge circuit, the switching means being disposed for operation to connect the auxiliary resistor in circuit relation with said another leg of the resistance bridge circuit and connect the temperature indicator thereacross and to simultaneously therewith disconnect the directionally energized means therefrom to effect a predetermined operation of the operating means to connect the transformer to the source of power supply in a predetermined manner.

4. In a system for regulating the temperature of a window having a resistor heating element associated therewith, in combination, a transformer disposed to be connected in circuit between the resistor heating element and a source of power supply, means disposed to be selectively energized to control the connections of the transformer in said circuit, means disposed for operation to effect the selective energization of said control means, a polarized relay disposed for operation to control the operation of the operating means, a resistance bridge circuit having a resistor leg thereof disposed in juxtaposition to the window whereby the resistance of said leg varies in accordance with the temperature of the window, an auxiliary resistor disposed to be connected in circuit relation with another leg of the resistance bridge circuit to recalibrate the balance point of the bridge circuit, an indicator disposed to be connected across the resistance bridge circuit to give an indication of the temperature of the window, and switching means disposed to connect the polarized relay across the resistance bridge circuit to control the operation of the operating means in accordance with the unbalance of the resistance bridge circuit, the switching means being disposed for operation to connect the auxiliary resistor in circuit relation with said another leg of the resistance bridge circuit and connect the temperature indicator thereacross and to simultaneously therewith disconnect the polarized relay therefrom to effect a predetermined operation of the operating means to connect the transformer to the source of power supply in a predetermined manner.

5. In a system for regulating the temperature of a window having a resistor heating element associated therewith, in combination, a transformer disposed to be connected in circuit between the resistor heating element and a source of power supply, means disposed to be selectively energized for controlling the connections of the transformer in said circuit to thereby control the flow of current to the heating element, a polarized relay disposed to be directionally energized for controlling the energization of the selectively energized means, a resistance bridge circuit having a resistor leg thereof disposed in juxtaposition to the window whereby the resistance of said leg varies in accordance with the temperature of the window, an auxiliary resistor disposed to be connected in parallel circuit relation with another leg of the resistance bridge circuit to recalibrate the balance point of the bridge circuit, an indicator disposed to be connected across the resistance bridge circuit to give an indication of the temperature of the window, and switching means disposed to connect the polarized relay across the resistance bridge circuit for controlling the energization of the selectively energized means in accordance with the unbalance of the resistance bridge circuit, the switching means being disposed for operation to connect the auxiliary resistor in parallel circuit relation with said another leg of the resistance bridge circuit and connect the temperature indicator thereacross and simultaneously therewith disconnect the polarized relay therefrom to effect a predetermined operation of the selectively energized means to connect the transformer to the source of power supply in a predetermined manner.

CLARENCE L. MERSHON.

REFERENCES CITED

The following references are of record in the file of this patent:

UNITED STATES PATENTS

| Number | Name | Date |
|---|---|---|
| 1,715,750 | Gano | June 4, 1929 |
| 2,016,660 | Weeks | Oct. 8, 1935 |
| 2,090,188 | Dahlstrom | Aug. 17, 1937 |
| 2,102,030 | Quereau | Dec. 14, 1937 |
| 2,366,614 | Hansell | Jan. 2, 1945 |